(12) United States Patent
Rabinovitch et al.

(10) Patent No.: US 8,280,644 B2
(45) Date of Patent: Oct. 2, 2012

(54) SUSTAINABILITY SYSTEMS AND METHODS DIRECTED TO FOOD COMPOSITIONS

(75) Inventors: Kevin Lurie Rabinovitch, Franklin, TN (US); Daniel Lee Beyer, Franklin, TN (US); Eyal Ben-Yoseph, Yoqneam (IL)

(73) Assignee: Mars, Incorporated, McLean, VA (US)

( * ) Notice: Subject to any disclaimer, the term of this patent is extended or adjusted under 35 U.S.C. 154(b) by 974 days.

(21) Appl. No.: 12/205,227

(22) Filed: Sep. 5, 2008

(65) Prior Publication Data
US 2009/0070040 A1 Mar. 12, 2009

Related U.S. Application Data

(60) Provisional application No. 60/970,390, filed on Sep. 6, 2007.

(51) Int. Cl.
*G01N 33/00* (2006.01)
(52) U.S. Cl. .......... 702/23
(58) Field of Classification Search .......... 702/23
See application file for complete search history.

(56) References Cited

U.S. PATENT DOCUMENTS

| | | | | |
|---|---|---|---|---|
| 6,115,672 | A * | 9/2000 | Caveny et al. | 702/19 |
| 2009/0181152 | A1* | 7/2009 | Stram et al. | 426/641 |
| 2010/0028524 | A1* | 2/2010 | Stram et al. | 426/646 |
| 2011/0144921 | A1* | 6/2011 | Ishibashi | 702/24 |
| 2011/0289082 | A1* | 11/2011 | Townsend | 707/733 |
| 2012/0021096 | A1* | 1/2012 | Alho-Lehto | 426/87 |

OTHER PUBLICATIONS

Amy Cortese, "Companies Warm up to the Idea of 'Green' Labels: The Business of Green", The International Herald Tribune, Mar. 22, 2007.
A. Shahbazi and Y. Goswami, "On-Farm and Off-Farm Energy Use," in Alternative Energy in Agriculture, vol. I, D. Yogi Goswami, 1986, CRC Press Inc., Boca Raton, Florida, pp. 5-28 and 209-211 (Appendix C).
Dan Dvoskin and Earl O. Heady, "Economic and Environmental Impacts of the Energy Crisis on Agricultural Production" in Agriculture and Energy, William Lockeretz, 1977, Academic Press, Inc., New York, pp. 1-17.
Roberto D. Sainz, Livestock-Environment Initiative Fossil Fuels Component: Framework for Calculating Fossil Fuel use in Livestock Systems, University of California Davis, 2003 published on Jan. 11, 2007 at URL <www.fao.org>.
B.A. Stout, Energy use and Management in Agriculture, 1984, Agricultural Engineering Department, Texas A&M University, Breton Publishers, North Scituate, Massachusetts, Chapter 2, pp. 21-56.
DOE/IEA-0384(2006) Energy Information Administration's United States Department of Energy Annual Energy Review 2005, published Jul. 2006.

(Continued)

*Primary Examiner* — Cindy H Khuu
(74) *Attorney, Agent, or Firm* — Christopher D. Brandt; Tracey S. Truitt; Polsinelli Shughart PC

(57) ABSTRACT

A method of calculating the carbon or greenhouse gas footprint of a food composition includes determining the $CO_2$ or greenhouse gas emission of each ingredient by associating a total energy value with the ingredient, determining the proportion of the total energy value contributed by each of at least one energy source, where each energy source has a characteristic $CO_2$ or greenhouse gas emissions value, and then calculating a $CO_2$ or greenhouse gas emission value for the ingredient based on the GHG emission values of each contributing energy source. Also, optimizing the $CO_2$ or greenhouse gas emissions in the formulation of pet food employs this method.

22 Claims, 5 Drawing Sheets

OTHER PUBLICATIONS

Gerald M. Ward et al., "Energy Requirements of Alternative Beef Production Systems in Colorado" in Agriculture and Energy, William Lockeretz, 1977, Academic Press, Inc., New York, pp. 395-409.

Gene K. Lee, "Energy Intensiveness of Washington Agriculture and the Effects of Increases in Energy Prices on Washington Agriculture," in Agriculture and Energy, William Lockeretz, 1977, Academic Press, Inc., New York, pp. 19-30.

Neil A. Patrick, "Energy use Patterns for Agricultural Production in New Mexico," in Agriculture and Energy, William Lockeretz, 1977, Academic Press, Inc., New York, pp. 31-40.

* cited by examiner

SUSTAINABILITY SYSTEMS AND METHODS DIRECTED TO FOOD COMPOSITIONS

CROSS-REFERENCE TO RELATED APPLICATIONS

This application claims the benefit of U.S. provisional application Ser. No. 60/970,390 filed Sep. 6, 2007, which is incorporated by reference herein in its entirety.

TECHNOLOGY FIELD

The present invention relates to methods of measuring the greenhouse gas emissions associated with a food product and reducing or offsetting those greenhouse gas emissions.

BACKGROUND

The Kyoto Protocol to the United Nations Framework Convention on Climate Change is an amendment to the international treaty on climate change, assigning mandatory emission limitations for the reduction of greenhouse gas emissions to the signatory nations. The objective is the stabilization of greenhouse gas concentrations in the atmosphere at a level that would prevent dangerous anthropogenic interference with the climate system by lowering the overall emissions of six greenhouse gases (hereinafter simply "GHG")—carbon dioxide, methane, nitrous oxide, sulfur hexafluoride, HFCs, and PFCs. Under the Kyoto Protocol, signatory industrialized countries have agreed to reduce their collective greenhouse gas emission by 5.2% compared to the year 1990, calculated as an average over the five-year period between 2008 and 2012. If by the year 2010, however, the average greenhouse gas emissions were reduced by 5.2% compared to the year 1990 that would actually represent a 29% reduction compared to projected levels of greenhouse gas emissions for the year 2010.

The Kyoto Protocol is a "cap and trade" system that imposes national caps on the emissions of Annex I countries. In other words, countries that ratify the Kyoto Protocol commit to reduce their greenhouse gas emissions or engage in trading of emissions credits if they maintain or increase their greenhouse gas emissions levels. As of December 2006, a total of 169 countries and other governmental entities have ratified the agreement, representing over 61.6% of greenhouse gas emissions from Annex I countries.

Although the caps are national-level commitments, in practice, many countries have proposed to devolve their emissions targets to individual companies by instituting Assigned Allocation Units (hereinafter simply "allowances"). This means that ultimately the buyers of emission credits are likely to be individual companies that expect their greenhouse gas emissions to exceed their allowances. Thus, even if not compelled by the environmental impact of greenhouse gas emissions, companies are might be compelled to engage in the "cap and trade" system by government regulations establishing allowances for individual companies. As a result, individual companies may be faced with finding ways to reduce their greenhouse gas emission or purchasing emissions credits directly from another party with excess allowances, from a broker, or on an exchange.

SUMMARY

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter.

The present invention is directed to methods of determining, optimizing, and evaluating the GHG footprint of a food composition. According to one implementation, a method of determining the GHG footprint of a food composition comprises: identifying the constituents of the food composition; determining the GHG emissions associated with the production of each constituent; and adding the GHG emissions associated with the production of each constituent to determine the GHG footprint of the food composition.

According to one implementation, a method of optimizing the GHG footprint of a food composition comprises: establishing a desired GHG footprint, a desired nutritional profile and a desired cost for the food composition; identifying available ingredients; determining the GHG footprint, the nutritional content, and cost of each ingredient; determining a composition of ingredients that satisfy the desired GHG footprint, nutritional content, or cost, or any combinations thereof. In another implementation, the method may further include establishing desired functional properties and determining whether a composition of ingredients satisfies those functional properties.

According to one implementation, a method of evaluating a food composition comprises: identifying the ingredients of a food composition; identifying available substitute ingredients; determining the GHG footprint of each ingredient; determining the nutritional content of each ingredient; determining whether there are any ingredients that can be nutritionally substituted with substitute ingredients; and determining the effect of substituting, adding, or omitting an ingredient on the GHG footprint of the food composition. In another implementation, the method may further include determining the monetary value of the effect on the GHG footprint.

According to one embodiment, the determination of the GHG emissions/footprint associated with the production of a constituent or ingredient includes: determining the energy usage associated with producing the constituent; identifying the sources of the energy used in producing the constituent; determining the amount of the total energy usage associated with each energy source; converting the amounts of the total energy usage associated with each energy source to amounts of $CO_2$ emissions; and adding the amounts of $CO_2$ emissions associated with each energy source to determine the total GHG emissions associated with the production of the constituent.

According to another embodiment, the determination of the GHG emissions/footprint associated with the production of a constituent or ingredient includes: determining the energy usage associated with producing the constituent; identifying the sources of the energy used in producing the constituent; determining the amount of the total energy usage associated with each energy source; converting the amounts of the total energy usage associated with each energy source to amounts of GHG emissions; converting the amounts of GHG emissions associated with each energy source to a $CO_2$ equivalent value; and adding the $CO_2$ equivalent values associated with each energy source to determine the total GHG emissions associated with the production of the constituent.

In some implementations, certain steps of the methods described herein can be omitted, combined with steps not described, or performed simultaneously or in a different order, without deviating from the objective of the methods or without producing different results.

BRIEF DESCRIPTION OF THE DRAWINGS

The foregoing summary, as well as the following detailed description, is better understood when read in conjunction with the appended drawings. For the purpose of illustration, there is shown in the drawings exemplary methods; however, the invention is not limited to the specific methods disclosed.

DETAILED DESCRIPTION OF ILLUSTRATIVE EMBODIMENTS

Exemplary embodiments are illustrated in referenced Figures of the drawings. It is intended that the embodiments and Figures disclosed herein are to be considered illustrative rather than restrictive.

Calculation of the GHG Footprint of a Food Product

Figure 1:
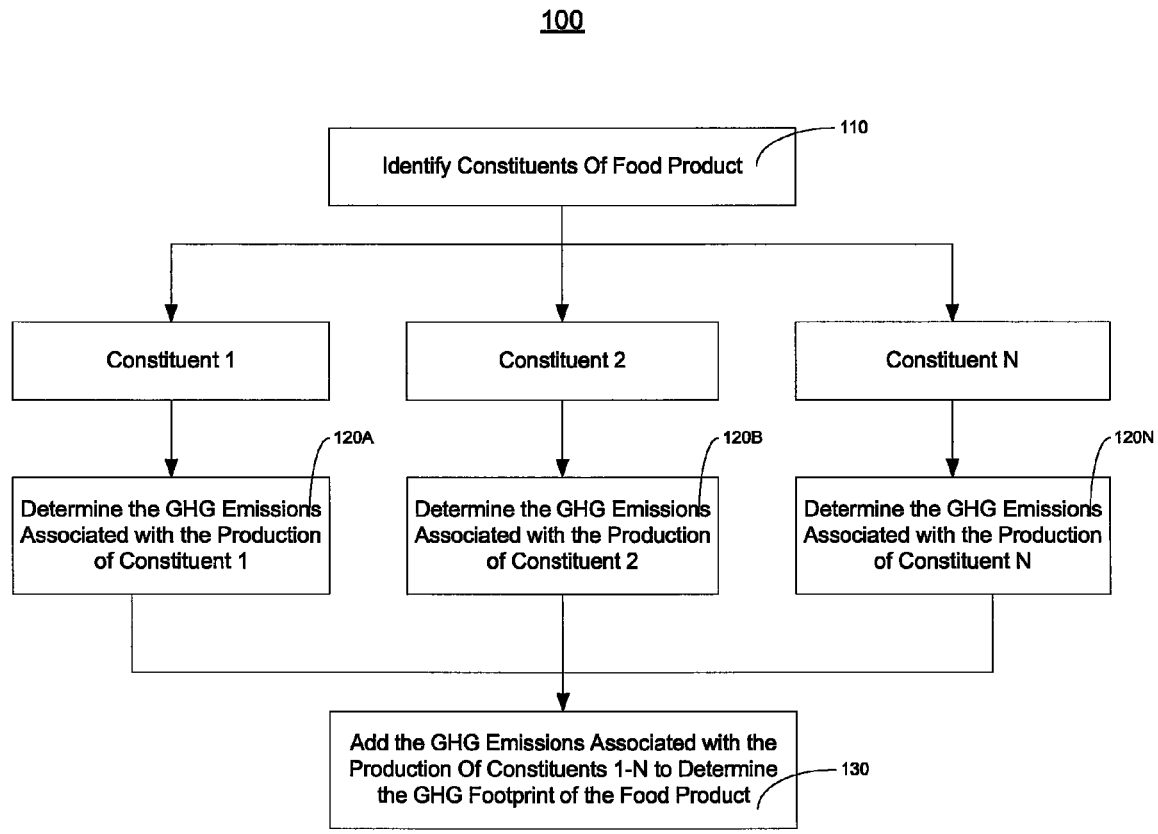
FIG. 1 is a flow diagram illustrating the steps of an exemplary method.

According to one implementation, as illustrated in FIG. 1, the method 100 of calculating the GHG footprint of a food product 100 begins by identifying the constituents of the food product in a step 110. For purposes of illustrating the method, N number of constituents was chosen and illustrated as constituents 1-N. In a step generally referred to as 120, the GHG emissions associated with the production of a constituent are determined. For illustration purposes, the step 120 is shown as steps 120A-120N to indicate to which constituent it relates. Steps 120A-120N, however, are identical and refer to the same step generally referred to as 120. Thus, the GHG emissions associated with the production of each constituent can be added together to determine the GHG footprint of the food product in a step 130. In a preferred embodiment, the GHG emissions associated with the production of each constituent and the GHG footprint of the food product are calculated on a per unit of mass basis.

Determination of the GHG Emissions Associated with the Production of a Constituent $CO_2$ is the most prominent GHG in the Earth's atmosphere and is believed to be the most important contributor to the greenhouse effect that is driving global warming. As a result, in certain implementations, it may be useful to define GHG emissions as just simply $CO_2$ emissions. Thus, in a method 120', the measure of GHG emissions is characterized in terms of $CO_2$ emissions.

Figure 2:
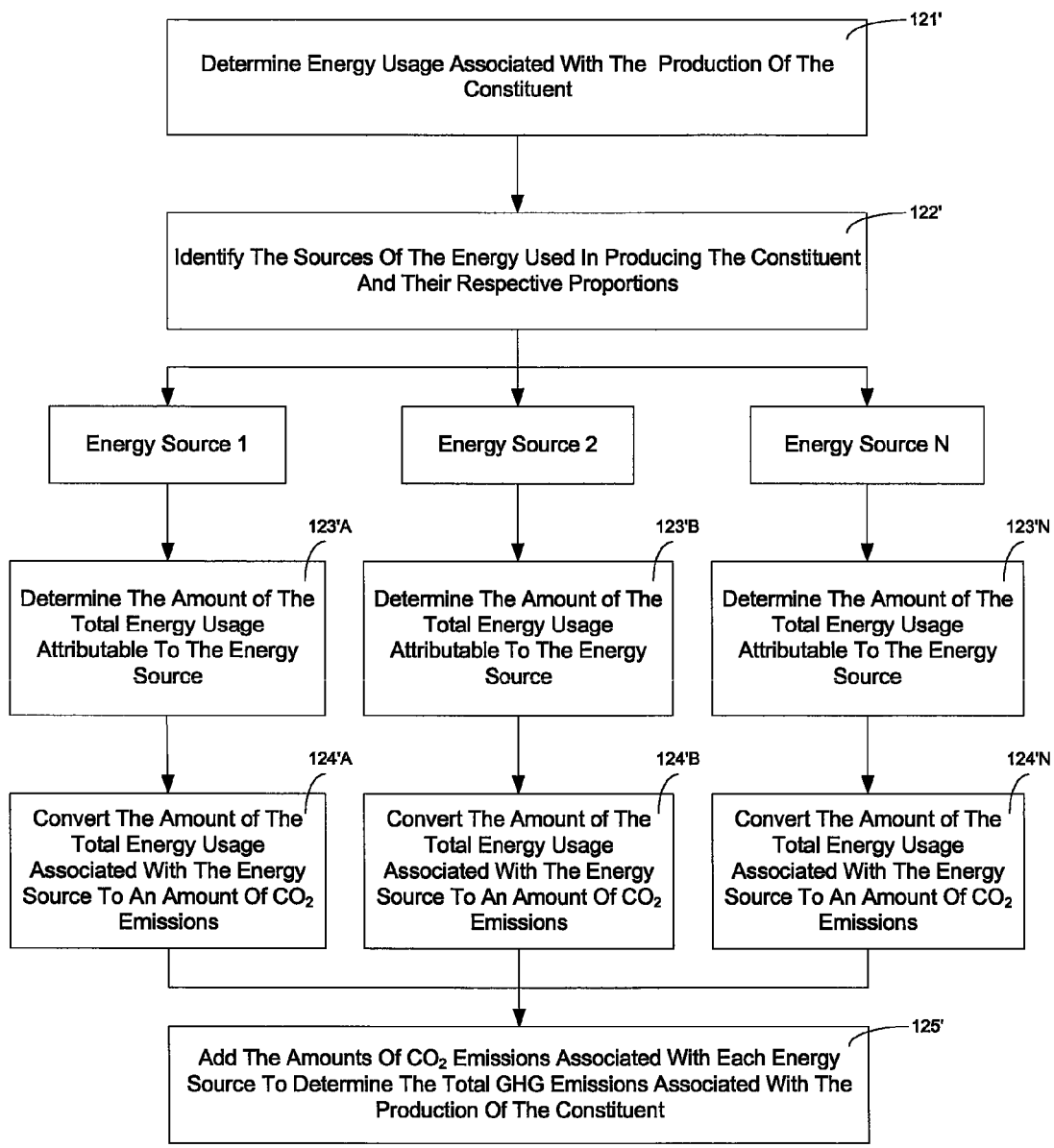
FIG. 2 is a flow diagram illustrating the steps of another exemplary method.

FIG. 2 illustrates in detail one example of a method 120' of determining the GHG emissions associated with the production of a constituent. As shown, the method 120' of determining the GHG emissions associated with the production of a constituent includes: a step 121' of determining the energy usage associated with producing the constituent; a step 122' of identifying the sources of the energy used in producing the constituent; steps 123'A-123'N of determining the amount of the total energy usage associated with each energy source; steps 124'A-124'N of converting the amounts of the total energy usage associated with each energy source to amounts of $CO_2$ emissions; and a step 125' of adding the amounts of $CO_2$ emissions associated with each energy source to determine the total GHG emissions associated with the production of the constituent.

In step 121', an energy usage value associated with the production of each constituent is determined. The energy usage value may include, for example, the energy required to plant, grow, harvest, transport, convert, and store a crop. The energy usage value may have many inputs, including the energy required to create the machines used, the fuel to run the machines, the oil to lubricate the machines, the pesticide to treat the crops, and any other product that is consumed in the production of the constituent. Preferably, the energy usage value is given in a per unit of mass of the constituent and reflects the amount of energy required to produce the final constituent and not any waste products or byproducts.

In one example, the energy usage value is determined by referring to published data. Further, the energy usage value is preferably determined by averaging the values from multiple data sources. Exemplary sources for energy usage data include: *Alternative Energy in Agriculture,* Volume I, D. Yogi Goswami; *Agriculture and Energy,* William Lockeretz, Center for the Biology of Natural Systems, Washington University, St. Louis, Mo.; *Framework for Calculating Fossil Fuel Use in Livestock Systems—Fossil Fuel Component,* Roberto D. Sainz, University of California Davis, 2003.

In step 122', the various sources of the energy used to produce the constituent and their respective proportions are identified. For example, the energy used to produce a constituent may come from many sources in various proportions, including: gasoline, diesel, fuel oil, LP gas, natural gas, electricity derived from coal, electricity derived from petrol, and renewable electricity. For illustration purposes, FIG. 2 shows N number of sources of energy numbered 1-N. In one example, the sources of energy associated with the production of a particular constituent are identified by referring to published data. Such data can be found in publications such as, for example, *Energy Use and Management in Agriculture,* B. A Stout, Agricultural Engineering Department, Texas A&M University, Breton Publishers, North Scituate, Mass. Such publications provide a breakdown, in percentages by source, of the energy used to produce a given constituent or class of constituents.

In a step generally referred to as 123', the amount of the total energy usage attributable to each energy source is determined. In step 123', the energy usage determined in step 121' is combined with the proportions of each energy source determined in step 122' to determine the amount of the total energy usage attributable to each energy source. For example, if the energy usage associated with the production of a constituent is determined to be E and it is determined that X %, Y %, and Z % of the energy used to produce the constituent comes from sources A, B, and C, respectively, then X %*E, Y %*E, and Z %*E of the energy usage is attributable to sources A, B, and C, respectively. For illustration purposes, step 123' is shown as steps 123'A-123'N to indicate to which energy source it relates. Steps 123'A-123'N, however, are identical and refer to the same step generally referred to as 123'.

In a step generally referred to as 124', each amount of the energy usage determined in steps 123'A-123'N is converted to an amount of $CO_2$ emissions. Different conversion factors may have to be used for different energy sources, because there may be higher $CO_2$ emissions on a per unit of energy basis associated with certain energy sources than with others. Thus, the various sources of the energy used to produce the constituent and their respective proportions are identified in previous step 122. Carbon emission conversion factors for different energy sources are given by, for example, the Energy Information Administration's *United States Department of Energy Annual Energy Review* 2005. Also, step 124' may require multiple conversions of units. For example, energy usage expressed in kcal may have to be converted to BTU, then to carbon emissions, and then to $CO_2$ emissions. Again, for illustration purposes, step 124' is shown as steps 124'A-124'N to indicate to which energy source it relates. Steps 124'A-124'N, however, are identical and refer to the same step generally referred to as 124'.

In step 125', the amounts of $CO_2$ emissions associated with each energy source are added to determine the total GHG emissions associated with the production of the constituent. As illustrated in FIG. 1, the steps of method 120' can be performed in conjunction with or as part of other methods. FIG. 1 illustrates how the steps of method 120' can be used to determine the $CO_2$ emissions of a plurality of constituents, and therefore, determine the total GHG emissions for a product.

In addition to $CO_2$, there may be other GHG's that are generated during the production of a constituent. Thus, in some implementations, it may be useful to define GHG emissions to include emissions of at least the following gases: carbon dioxide, methane, nitrous oxide, sulfur hexafluoride, HFCs, and PFCs. Preferably, however, the GHG emissions should be characterized in terms of $CO_2$ equivalents, because the market for emissions credits is primarily defined in terms of $CO_2$ emissions.

Figure 3:
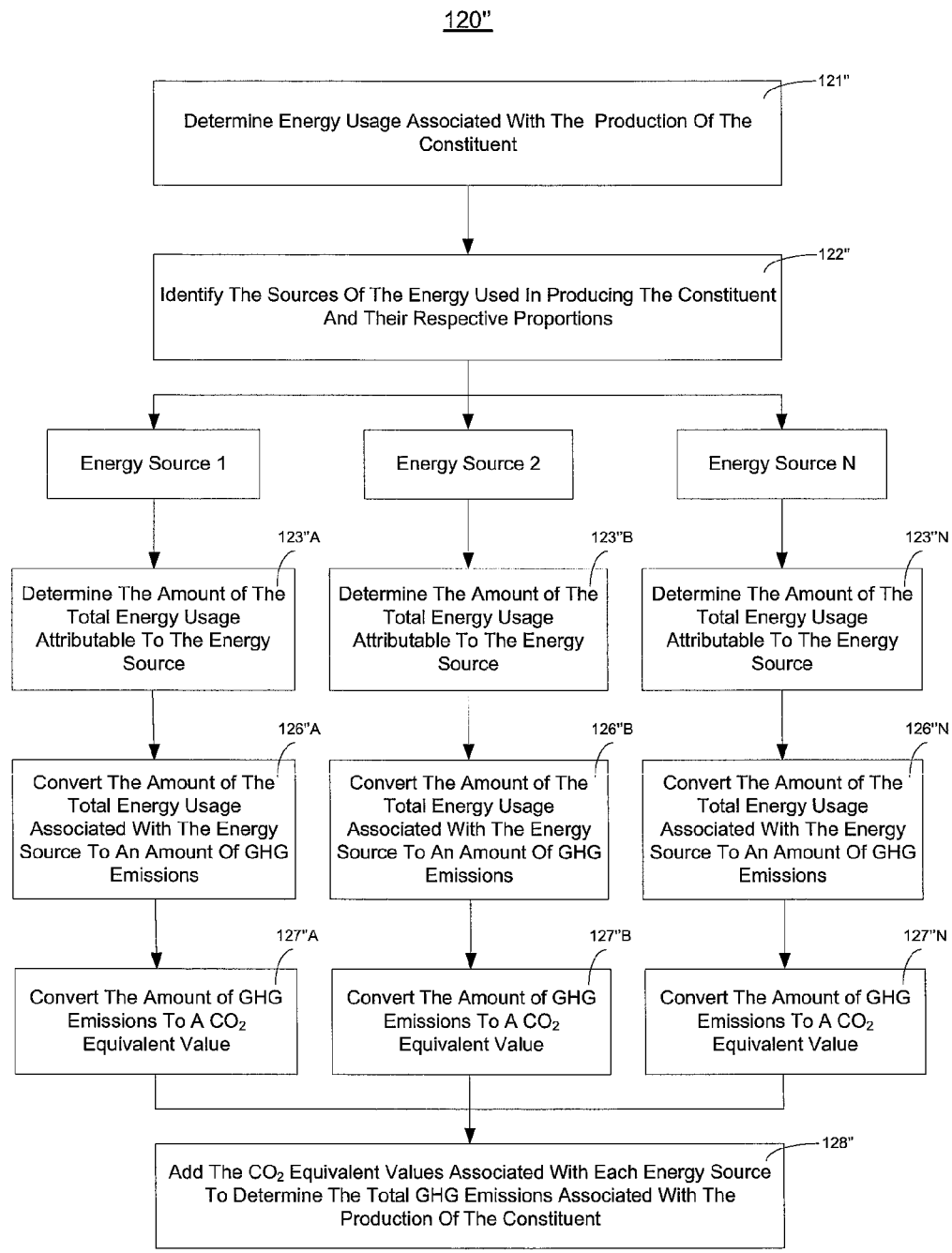
FIG. 3 is a flow diagram illustrating the steps of another exemplary method.

For example, FIG. 3 illustrates in detail another example of a method 120" of determining the GHG emissions associated with the production of a constituent. As shown, the method 120" of determining the GHG emissions associated with the production of a constituent includes: a step 121" of determining the energy usage associated with producing the constituent; a step 122" of identifying the sources of the energy used in producing the constituent; steps 123"A-123"N of determining the amount of the total energy usage associated with each energy source; steps 126"A-126"N of converting the amounts of the total energy usage associated with each energy source to amounts of GHG emissions; a step 127" of converting the amounts of GHG emissions associated with each energy source to a $CO_2$ equivalent value; and a step 128" of adding the $CO_2$ equivalent values associated with each energy source to determine the total GHG emissions associated with the production of the constituent.

In step 121", an energy usage value associated with the production of each constituent is determined. In step 122", the various sources of the energy used to produce the constituent and their respective proportions are identified. In step 123", the amount of the total energy usage attributable to each energy source is determined. Steps 121", 122", and 123" of method 120" correspond to steps 121', 122', and 123' of method 120', respectively. Thus, steps 121", 122", and 123" may be performed in accordance with the above description of steps 121', 122', and 123' of method 120'.

In a step generally referred to as 126", each amount of the energy usage determined in steps 123"A-123"N is converted to an amount of GHG emissions. For a given amount of energy derived from a particular energy source there may be various GHG emissions generated, including carbon dioxide, methane, nitrous oxide, sulfur hexafluoride, HFCs, and PFCs. Thus, in step 126", a given amount of energy derived from a particular source is converted to amounts of emissions of each type of GHG—carbon dioxide, methane, nitrous oxide, sulfur hexafluoride, HFCs, and PFCs. Each energy source may use different conversion factors to convert an amount of energy to amounts of emissions of each type of GHG. For illustration purposes, step 126" is shown as steps 126"A-126"N to indicate to which energy source it relates. Steps 126"A-126"N, however, are identical and refer to the same step generally referred to as 126".

In step 127", the amounts of emissions of each type of GHG associated with each energy source are converted to a $CO_2$ equivalent value. In other words, amounts of methane, nitrous oxide, sulfur hexafluoride, HFC, or PFC emissions associated with an amount of energy from a particular energy source are preferably characterized in terms of equivalent $CO_2$ emission values by converting values of methane, nitrous oxide, sulfur hexafluoride, HFC, or PFC emissions to equivalent values of $CO_2$ emissions. The conversion of units from one type of GHG to a $CO_2$ equivalent may be done by referring to known conversion factors. Currently, expressing GHG emissions in terms of $CO_2$ emissions may be desirable because the market for emissions credits is defined in term of $CO_2$ emissions. It is, however, possible to implement step 127" and convert all GHG emissions to any one type of GHG emissions, such as carbon dioxide, methane, nitrous oxide, sulfur hexafluoride, HFCs, or PFCs. For illustration purposes, step 127" is shown as steps 127"A-127"N to indicate to which energy source it relates. Steps 127"A-127"N, however, are identical and refer to the same step generally referred to as 127".

In step 128", the $CO_2$ equivalent values determined in steps 127"A-127"N are added to determine the total GHG emissions associated with the production of the constituent. As illustrated in FIG. 1, the steps of method 120" can be performed in conjunction with or as part of other methods. FIG. 1 illustrates how the steps of method 120" can be used to determine the GHG emissions associated with a product and express the emissions in terms of $CO_2$ equivalents.

Methods of Optimizing the GHG Footprint of a Food Composition

Figure 4:
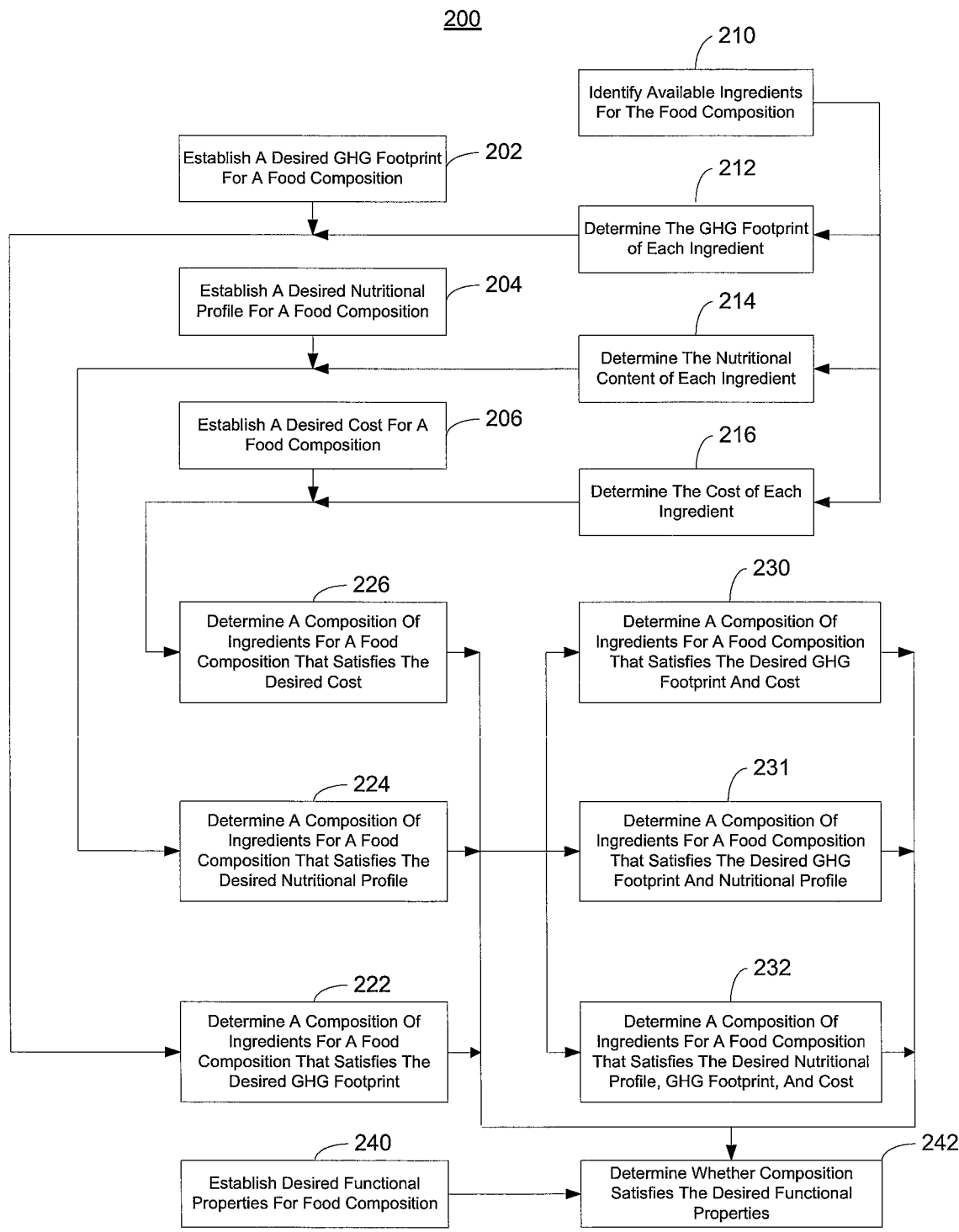
FIG. 4 is a flow diagram illustrating the steps of another exemplary method.

FIG. 4 shows a flow diagram of one implementation of a method 200 of optimizing the GHG footprint of a food composition. In a first implementation, the method 200 comprises: a step 202 of establishing a desired GHG footprint for the food composition and at least one of a step 204 of establishing a desired nutritional profile for the food composition or a step 206 of establishing a desired cost; a step 210 of identifying available ingredients; a step 212 of determining the GHG footprint of each ingredient and at least one of a step 214 of determining the nutritional content of each ingredient or a step 216 of determining the cost of each ingredient; a step 222 of determining a composition of ingredients that satisfy the desired GHG footprint. Preferably, the desired GHG footprint and the GHG footprint determinations are characterized in terms of $CO_2$ emissions or $CO_2$ emission equivalents.

In addition to the steps of the first implementation of method 200, a second implementation may further comprise a step 224 of determining a composition of ingredients that satisfy the desired nutritional profile and/or a step 226 of determining a composition of ingredients that satisfy the desired cost. In addition to the steps of the second implementation of method 200, a third implementation may further comprise at least one of a step 230 of determining a composition of ingredients that satisfy the desired GHG footprint and cost, a step 231 of determining a composition of ingredients that satisfy the desired nutritional profile and GHG footprint, or a step 232 of determining a composition of ingredients that satisfy the desired nutritional profile, GHG footprint, and cost. In addition to the steps of the third implementation of method 200, a fourth implementation may further comprise a step 240 of establishing desired functional properties and a step 242 of determining whether a composition of ingredients determined in a step 222, 224, 226, 230, 231, or 232 satisfies those functional properties. In some implementations, certain steps of method 200 can be omitted, combined with steps not described, or performed simultaneously or in a different order, without deviating from the objective of method 200 or without producing different results.

In step 210, the ingredients that are available for use in a food composition are identified. Each of the ingredients is characterized by determining the GHG footprint of the ingredient in a step 212. In one implementation of the step 212, the GHG footprint is determined according to the above-described methods, which are generally referenced as step 120 and more particularly referenced as steps 120' and 120". Preferably, the GHG footprint is characterized in terms of $CO_2$ emissions or $CO_2$ emission equivalents. Each of the ingredients may be further characterized by determining the nutritional content of the ingredient in a step 214 and/or determining the cost of the ingredient in a step 216. Additionally, certain parameters for the food composition may be established. For example, in a step 202, a desired GHG footprint for the food composition may be established, which can be either a single value or a range of values. The desired GHG footprint is preferably characterized in terms of $CO_2$ emissions or $CO_2$ emission equivalents. Further, a desired nutritional profile and/or a desired cost for the food composition may be established. The desired nutritional profile and cost can be expressed as single values or ranges of values.

Generally, a pet food composition may be formulated by combining various ingredients in various proportions such that the final pet food composition falls within specified parameters for various factors such as, for example, nutrition, cost, GHG footprint, texture, color, elasticity, rigidity, water binding capacity, density, water activity, moisture, stool quality, digestibility, palatability, and chew time or meal duration. In step 222, based on the GHG footprints of individual ingredients, at least one composition of ingredients that satisfies the desired GHG footprint for the food composition is determined. In step 224, based on the nutritional content of individual ingredients, at least one composition of ingredients that satisfies the desired nutritional profile for the food composition is determined. In step 226, based on the cost of individual ingredients, at least one composition of ingredients that satisfies the desired cost for the food composition is determined. In step 230, it is determined whether there is a composition of ingredients that satisfies the desired GHG footprint and cost based on the determinations of steps 222 and 226. In step 231, it is determined whether there is a composition of ingredients that satisfies the desired GHG footprint and nutritional profile based on the determinations of steps 222 and 224. In step 232, it is determined whether there is a composition of ingredients that satisfies the desired GHG footprint, nutritional profile, and cost based on the determinations of steps 222, 224, and 226.

Additionally, with respect to the determination of suitable food compositions in steps 231 and 232, different weight can be given to each criterion (i.e. GHG footprint, nutritional profile, and cost). Thus, food compositions may be determined in steps 231 and 232 according to the weight given to each criterion. According to another implementation of method 200, a food composition may also be controlled for certain functional properties. In a step 240, desired functional properties for the food composition may be established. For example, criteria for functional properties such as, for example, texture, color, elasticity, rigidity, water binding capacity, density, water activity, moisture, stool quality, digestibility, palatability, and chew time or meal duration may be established for the final food composition. Thus, in a step 242, it may be determined whether a food composition determined in a step 222, 224, 226, 230, 231, or 232 satisfies the functional properties established in step 240.

Methods of Evaluating a Food Composition

Figure 5:
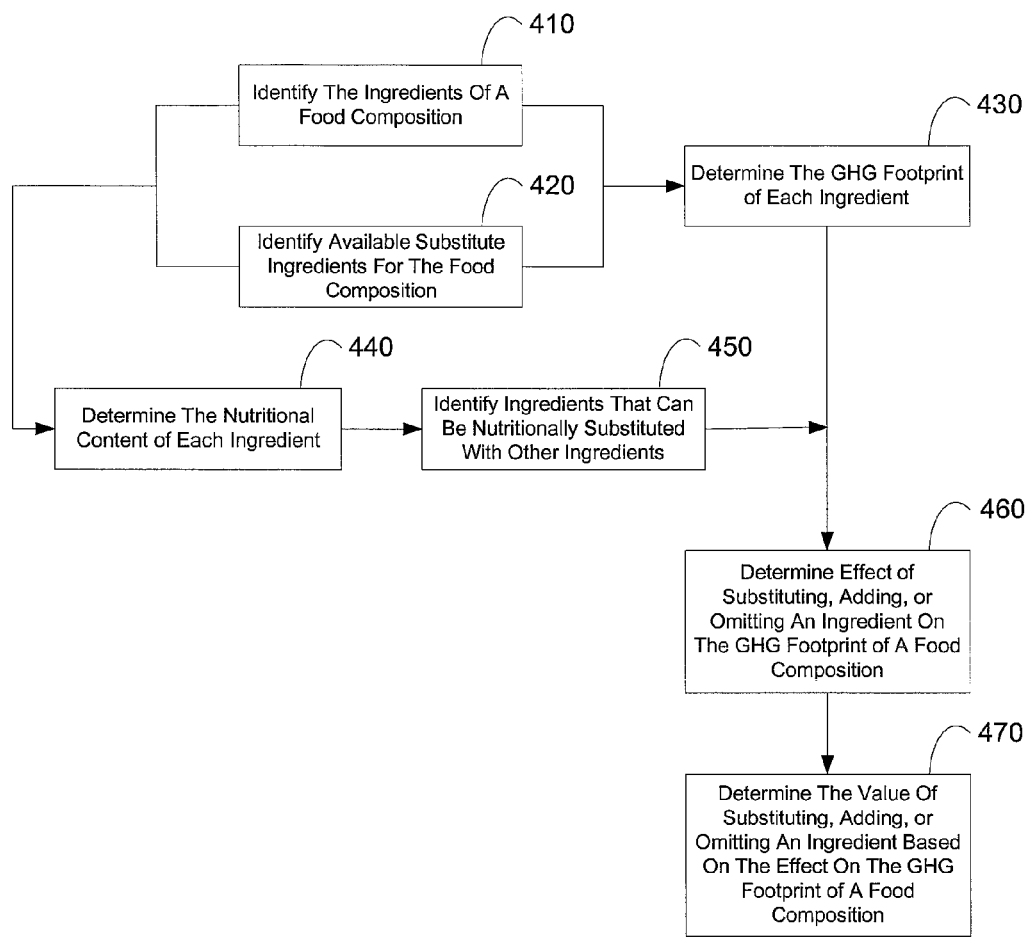
FIG. 5 is a flow diagram illustrating the steps of another exemplary method.

FIG. 5 illustrates an exemplary implementation of a method 400 of evaluating a food composition. In a first implementation, the method 400 comprises: a step 410 of identifying the ingredients of a food composition; a step 420 of identifying available substitute ingredients; a step 430 of determining the GHG footprint of each ingredient; a step 440 of determining the nutritional content of each ingredient; a step 450 of determining whether there are any ingredients that can be nutritionally substituted with substitute ingredients; and a step 460 of determining the effect of substituting, adding, or omitting an ingredient on the GHG footprint of the food composition. In another implementation, the method 400 may further include a step 470 of determining the monetary value of the effect on the GHG footprint determined in step 460. In some implementations, certain steps of method 400 can be omitted, combined with steps not described, or performed simultaneously or in a different order, without deviating from the objective of method 400 or without producing different results.

In step 410, the ingredients of a food composition are identified. In one implementation of step 410, the ingredients may be further identified by type of nutrient(s), such as, for example, Arachidonic Acid, Arginine, Ash, Biotin, Calcium, Chloride, Choline, Copper, Crude Fat, Crude Fiber, Crude Protein, Cystine, DHA, Dietary Fiber, EPA, Folic Acid, Histidine, Insoluble Fiber, Iodine, Iron, Isoleucine, Leucine, Linoleic Acid, Lysine, Magnesium, Manganese, Methionine, NFE, Niacin, Pantothenic Acid, Phenylalanine, Phosphorus, Potassium, Pyridoxine, Riboflavin, Selenium, Sodium, Soluble Fiber, Taurine, Thiamin, Threonine, Tryptophan, Tyrosine, Valine, Vitamin A, Vitamin B12, Vitamin D, Vitamin E, Vitamin K, Zinc, etc. In step 420, substitute ingredients for the food composition are identified. In one implementation of the step 420, the substitute ingredients may be categorized by type of nutrient, such as, for example, protein, fat, carbohydrate, etc. Thus, for example, ingredients such as meat and bone meal, soy protein isolate, soy protein concentrate, gluten meal, etc., may be grouped under the protein category.

In step 430, the GHG footprint of each ingredient is determined. In one implementation of the step 430, the GHG footprint is determined according to the above-described methods, which are generally referenced as step 120 and more particularly referenced as steps 120' and 120". Preferably, the GHG footprint is characterized in terms of $CO_2$ emissions or $CO_2$ emission equivalents.

In step 440, the nutritional content of each ingredient is identified. In step 450, it is determined whether any of the ingredients that can be nutritionally substituted with substitute ingredients. In one implementation of step 450, the determination of whether an ingredient may be substituted for another is done with reference to the nutrient classification of the ingredients in steps 410 and 420. Thus, if the ingredients are classified under the same nutrient category, then they may be determined as suitable candidates for substitution, but may be subject to other considerations. Other relevant considerations in determining appropriate ingredient substitutions and final food compositions may be, for example, cost, texture, color, elasticity, rigidity, water binding capacity, density, water activity, moisture, stool quality, digestibility, palatability, and chew time or meal duration.

In step 460, based on the GHG footprint of each ingredient, the GHG footprint effect of substituting, adding, or omitting ingredients of the food composition is determined. In step 460, a value determined for the effect on the GHG footprint of the food composition. For example, carbon credits can be purchased on exchanges to offset carbon emissions. These credits are generally priced to reflect a market value. Thus, in step 460, a value may be assigned to a decrease or increase in the GHG footprint based on the market price of an equivalent carbon credit.

Computer Implementation of Methods

It is envisioned that the methods described herein, or certain aspects or portions thereof, may be well suited for implementation on computing systems. Thus, the various methods described herein may be implemented in connection with hardware or software or, where appropriate, with a combination of both. Thus, the means for implementing the methods described herein, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for implementing the methods. Additionally, the data necessary to practice the methods described herein may be stored in one or more databases. For example, data stored in databases may include: energy usage values of step 121; energy sources of step 122; conversion factors of steps 124, 126, and 127; ingredients of step 210; nutrition information of step 214; cost information of step 216; ingredients of step 420; nutrition information of step 440; and value of carbon credits of step 470.

What is claimed:

1. A method of optimizing a carbon footprint of a food composition comprising the steps of:
    determining a target nutritional profile for the food composition;
    determining a target greenhouse gases (GHG) footprint for the food composition;
    identifying a plurality of ingredients available for the food composition;
    determining a nutritional content of each of the plurality of ingredients;
    determining an GHG footprint of each of the plurality of ingredients; and
    determining a composition of some or all of the plurality of ingredients that, based on an aggregate of the nutritional content and the GHG footprint of the plurality of ingredients, fits the target nutritional profile and the target GHG footprint for the food composition,
    wherein at least one of the steps is performed using a computer.

2. The method of claim 1 wherein the food composition determined has the lowest possible GHG footprint within the target nutritional profile.

3. The method of claim 1 further comprising the steps of:
    determining a target cost for the food composition;
    determining the cost of each of the plurality of ingredients; and
    determining a composition of some or all of the ingredients that, in addition to the target nutritional profile and GHG footprint, also fits the target cost for the food composition based on the aggregate cost of the plurality of ingredients.

4. The method of claim 3 wherein the food composition determined has the lowest possible GHG footprint within the target nutritional profile and target cost.

5. The method of claim 1 further comprising the step of determining the GHG footprint of the food composition based on the GHG footprint of the plurality of ingredients.

6. The method of claim 1 wherein the step of determining the GHG footprint of each of the plurality of ingredients comprises:
    on a per unit of mass basis for each of the ingredients:
        associating a total energy value with each of the ingredients;
        determining the proportion of the total energy value contributed by each of at least one energy source, each energy source having a characteristic $CO_2$ emission value; and
        calculating a $CO_2$ emission value for each of the ingredients based on the $CO_2$ emission values of each contributing energy source.

7. The method of claim 1 wherein the step of determining the GHG footprint of each ingredient comprises:
    on a per unit of mass basis for each of the ingredients:
        associating a total energy value with each of the ingredients;
        determining the proportion of the total energy value contributed by each of at least one energy source, each energy source having a characteristic GHG emission value; and
        calculating a GHG emission value for each of the ingredients based on the GHG emission values of each contributing energy source; and
        calculating a $CO_2$ emission value for each of the ingredients by converting the GHG emission value for the ingredient to a $CO_2$ equivalent value.

8. The method of claim 6, wherein the step of associating the total energy value with each constituent includes deriving the value from publicly available information.

9. The method of claim 6, wherein the energy source includes at least one of coal, diesel fuel, fuel oil, LP gas, natural gas, or electricity.

10. The method of claim 9, wherein the electricity energy source includes energy from coal, oil, solar, hydro, geothermal, wind, and other renewable sources.

11. The method of claim 6, wherein the proportion of the total energy value of each constituent contributed by each of at least one energy source is obtained from publicly available information.

12. A method of evaluating the greenhouse gases (GHG) footprint of a food product including a plurality of constituents wherein the food product has a target nutritional profile and a target GHG footprint, said method comprising the steps of:
    a) calculating a GHG emission value for each constituent of the plurality of constituents on a per unit of mass basis;
    b) determining a composition of some or all of the constituents of the plurality of constituents that, based on an aggregate nutritional content and GHG footprint of the some or all of the plurality of constituents, fits the target nutritional profile and the target GHG footprint for the food product;

c) calculating a GHG footprint for the food product based on a weighted average of the GHG emission values of the plurality of constituents; and d) determining an effect of substituting, adding, or omitting one or more of the plurality of constituents on the GHG footprint of the product, including evaluating the results of the calculations of step a) and step c), wherein at least one of steps a), b), c), or d) is performed using a computer.

13. The method of claim 12 further comprising the step of determining a monetary value of the effect on the GHG footprint of the product.

14. The method of claim 12 wherein the step of calculating a GHG emission value for each constituent comprises:
on a per unit of mass basis:
associating a total energy value with the constituent;
determining the proportion of the total energy value contributed by each of at least one energy source, each energy source having a characteristic CO2 emission value; and
calculating a GHG emission value for the constituent based on the $CO_2$ emission values of each contributing energy source.

15. The method of claim 12 wherein the step of calculating a GHG emission value for each constituent comprises:
on a per unit of mass basis:
associating a total energy value with the constituent;
determining the proportion of the total energy value contributed by each of at least one energy source, each energy source having a characteristic GHG emission value; and
calculating a GHG emission value for the constituent based on the GHG emission values of each contributing energy source; and
converting the GHG emission value for the constituent to a $CO_2$ equivalent value.

16. A method of representing greenhouse gases (GHG) footprint information for a food product including a plurality of constituents in various proportions, wherein the food product has a target nutritional profile and a target GHG footprint, said method comprising the steps of:

a) calculating a GHG emission value for each constituent of the plurality of constituents on a per unit of mass basis;

b) determining a composition of some or all of the constituents that, based on an aggregate nutritional content and GHG footprint of the plurality of constituents, fits the target nutritional profile and the target GHG footprint for the food product c) calculating a GHG footprint for the food product based on a weighted average of the GHG emission values of each of the plurality of constituents; and d) publishing a measure of the GHG footprint of the food product, wherein at least one of steps a), b), or c) is performed using a computer.

17. The method of claim 16 wherein the step of calculating a GHG emission value for each constituent comprises:
on a per unit of mass basis:
associating a total energy value with the constituent;
determining the proportion of the total energy value contributed by each of at least one energy source, each energy source having a characteristic CO2 emission value; and
calculating a GHG emission value for the constituent based on the CO2 emission values of each contributing energy source.

18. The method of claim 16 wherein the step of calculating a GHG emission value for each constituent comprises:
on a per unit of mass basis:
associating a total energy value with the constituent;
determining the proportion of the total energy value contributed by each of at least one energy source, each energy source having a characteristic GHG emission value;
calculating a GHG emission value for the constituent based on the GHG emission values of each contributing energy source; and
converting the GHG emission value for the constituent to a $CO_2$ equivalent value.

19. The method of claim 16, wherein the publishing step c) includes printing the GHG footprint information on a product label.

20. A non-transitory computer-readable medium containing computer instructions stored therein for causing a computer processor to perform, said computer instructions comprising instructions for:

a) receiving an input from a user and identifying a plurality of constituents of a food product in various proportions, said food product having a target nutritional profile and a target greenhouse gases (GHG) footprint;

b) for each of the plurality of constituents, on a per unit of mass basis:
associating a total energy value with the constituent, wherein the total energy value comes from at least one energy source;
determining a proportion of the total energy value contributed by each of the at least one energy source, the energy source having a characteristic $CO_2$ emission value; and calculating a $CO_2$ emission value for the constituent based on the contribution of the $CO_2$ emission values of each contributing energy source;

c) determining a composition of some or all of the constituents that, based on an aggregate nutritional content and GHG footprint of the plurality of constituents, fits the target nutritional profile and the target GHG footprint for the food product and, d) calculating a $CO_2$ emission value for the food product based on the weighted average of the CO2 emission values of each of the plurality of constituents.

21. A method of formulating a food composition comprising the steps of:

a) identifying a plurality of ingredients available for the food composition;

b) determining a nutritional content of each of the plurality of ingredients;

c) determining a greenhouse gases (GHG) footprint of each of the plurality of ingredients; and d) combining the ingredients in various proportions to formulate a food composition such that the food composition falls within a target GHG footprint for the food composition, based on an aggregate of the nutritional content and the GHG footprint of the plurality of ingredients, wherein the food composition fits a target nutritional profile and the target GHG footprint for the food composition, wherein at least one of the steps is performed using a computer.

22. A method of formulating a food composition with an optimized carbon footprint comprising the steps of:
   a) determining a target nutritional profile for the food composition;
   b) determining a target greenhouse gases (GHG) footprint for the food composition;
   c) identifying a plurality of ingredients available for the food composition;
   d) determining a nutritional content of each of the plurality of ingredients;
   e) determining a GHG footprint of each of the plurality of ingredients; and
   f) combining the plurality of ingredients in various proportions to formulate a food composition having some or all of the plurality of ingredients that, based on an aggregate of the nutritional content and the GHG footprint of the plurality of ingredients, fits the target nutritional profile and the target GHG footprint for the food composition, wherein at least one of the steps is performed using a computer.

* * * * *